Patented July 31, 1951

2,562,718

UNITED STATES PATENT OFFICE 2,562,718

DEFLUORINATION OF PHOSPHATE ROCK

Clinton A. Hollingsworth, Lakeland, Fla., assignor to Coronet Phosphate Company, New York, N. Y., a corporation of New York No Drawing. Application October 18, 1947, Serial No. 780,747

5 Claims. (Cl. 71—44)

This invention relates to the defluorination of natural phosphate materials, and has for its object the provision of an improved method of defluorinating such materials by calcination.

Fluorine is present in practically all native phosphate rock, in amount varying in the different areas in which it occurs. The common Florida phosphate rock (e. g. pebble rock, flotation concentrate, etc.) usually contains from 3.5 to 4% of fluorine, around 75% bone phosphate of lime (B. P. L.), around 5% silica, around 5% calcium carbonate, around 2% iron and aluminum oxides, and the balance organic matter and other impurities. The fluorine is commonly believed to be present as calcium fluoride and also combined with the tricalcium phosphate as calcium fluorphosphate or fluorapatite $Ca_{10}F_2(PO_4)_6$, and this combination is believed to be largely responsible for the low phosphate availability of the raw rock (or concentrate), as a fertilizer, as evidenced by the customary neutral ammonium citrate solubility test or the citric acid solubility test. Moreover, the high fluorine content of the raw rock makes it unsuitable as an animal feed or mineral supplement.

Among the many proposals heretofore advanced for defluorinating natural phosphate material are those in which a mixture of the material with phosphoric acid is calcined at a temperature below that at which the mixture fuses. The present invention is an improvement upon such proposals, and involves subjecting a natural phosphate material admixed with phosphoric acid to a two-stage heat-treatment or calcination, in the first stage of which part or substantially all of the fluorine is removed and in the second stage of which defluorination is completed, if necessary, and high fertilizer availability is imparted to the phosphate material. In the first stage, conducted in the presence of water vapor preferably at a temperature of 2000–2400° F., a substantial amount of fluorine is removed from the phosphate material without materially improving its availability as a fertilizer. In the second stage, the product of the first stage mixed with such an amount of lime as is theoretically required to form tricalcium phosphate with all of the phosphate in the product, and preferably with such additional amount of lime as is theoretically required to form dicalcium silicate with all the silica in the product, is calcined at a temperature of 2400–2700° F., or higher, and the remaining fluorine (if any) is removed from the phosphate material and its fertilizer availability is raised to a high value.

In the interest of simplicity and brevity, phosphate rock, or simply rock, herein includes any natural phosphate material. By first calcine is meant the product of the first stage heat-treatment, and final calcine means the product of the second stage heat-treatment. The phosphate content of the rock is expressed in terms of phosphorus pentoxide ($P_2O_5$), and the silica ($SiO_2$) content as insoluble matter (insol.) in accordance with the custom in the industry. "$C_3P$" and "$C_2S$" designate tricalcium phosphate $Ca_3(PO_4)_2$ and dicalcium silicate ($Ca_2SiO_4$), respectively. Phosphoric acid ($H_3PO_4$), lime (CaO), limestone ($CaCO_3$), carbon dioxide ($CO_2$), iron oxide ($Fe_2O_3$), aluminum oxide ($Al_2O_3$), fluorine (F) and hydrochloric acid (HCl) are frequently herein designated by their chemical symbols.

Preparatory to the first stage of heat-treatment, the phosphate rock is mixed with phosphoric acid. The amount of acid mixed with the rock will depend generally upon the extent of defluorination contemplated in the first stage of heat-treatment. Enough acid should be used to remove at least half of the fluorine at a temperature below the fusion temperature of the charge mixture, and at least 10% acid (calculated as $H_3PO_4$) is usually required for this purpose. With rocks containing 3 or more per cent fluorine and having a $P_2O_5$ content of 30 to 40%, substantially complete defluorination can be effected with a calcining temperature of about 2200° F. and a detention period of 10 to 20 minutes when from 15 to 20% of acid is mixed with the material, or about ½ part by weight of acid for each part by weight of $P_2O_5$ in the rock. The acid, in the form of an aqueous solution of suitable concentration, is intimately mixed with the rock in a clay mill, pug mill or any other suitable apparatus for handling dough-like mixtures. The rock may be relatively coarse, e. g. minus 20 mesh and mostly on 150 mesh such as a flotation concentrate, or it may be finely divided, e. g. minus 65 mesh and at least 65% through a 200 mesh Standard Tyler screen such as a finely ground rock or concentrate.

In the first stage of heat-treatment, the mixture of rock and acid is calcined in an atmosphere of water vapor at a temperature below that at which any fusion of the charge occurs. The permissible temperature range for calcination depends largely upon the amount of phosphoric acid with the rock, relatively large amounts of acid permitting a lower effective calcining temperature while limiting the higher temperature at which calcination can be conducted without fusion of the charge. Practical and economic considerations limit the amount of phosphoric acid that can be mixed with the rock to about 25%. Thus, depending upon the amount of acid mixed with the rock (i. e. from 10 to 25%) and the $P_2O_5$ and $SiO_2$ contents of the rock, the calcining temperature of the first stage of heat-treatment may vary in practice from about 1800° F. to about 2600° F. In the first stage of heat-treatment substantial defluorination of the rock is effected, at least half of the fluorine being removed, and under suitable conditions substantially complete defluorination may be effected. The effectiveness of the defluorination will depend upon the amount of phosphoric acid mixed with the rock (being greater with larger amounts of acid), the porosity of the charge, the temperature and duration of heat-treatment, and the completeness of water vapor contact with all parts of the charge. Even when substantially completely defluorinated, the availability of the phosphate in the first calcine will be too low for fertilizer purposes, mainly because of a deficit of lime to form tricalcium phosphate with all the $P_2O_5$ present and because the first stage calcining temperature is not sufficiently high to convert tricalcium phosphate to its alpha form.

Preparatory to the second stage of heat-treatment, the first calcine is ground and such an amount of lime is mixed with the ground product that the lime content of the mixture is at least sufficient to theoretically form tricalcium phosphate with all the phosphate present. Preferably, and particularly where the silica content of the rock exceeds about 4%, the amount of lime mixed with the first calcine should be sufficient to theoretically form dicalcium silicate with all the silica present, as well as tricalcium phosphate. The charge so chemically adjusted or balanced, and preferably nodulized, is calcined at a temperature between 2400 and 2700° F., or higher, in the presence of water vapor if further defluorination is to be effected, or in an atmosphere of air (i. e. without the introduction of water vapor other than that incident to the combustion of the fuel used for heating) if the fluorine was substantially all removed in the first stage. The calcining temperature should not be so high as to fuse the charge, and usually is between about 2500° F. and about 2700° F. Adjustment of both the phosphate and silica contents of the charge with lime permits a higher calcining temperature without objectionable fusion of the charge than is possible where only the phosphate content is adjusted, and the higher calcining temperature generally results in a more complete removal of fluorine and higher fertilizer availability of the phosphate.

Under present day trade requirements, a phosphate material having a fluorine content of over 1 part of fluorine per 40 parts of phosphorus is unsuitable for use as a mineral supplement in animal feed. To meet these requirements, a phosphate material of 20–25% $P_2O_5$ content should contain not more than about 0.2% fluorine, while a material of 40% $P_2O_5$ content may contain up to about 0.4%. Throughout this specification and the appended claims, substantially complete defluorination means a residual fluorine content of less than 1 part of fluorine per 40 parts of phosphorus. For use as a plant fertilizer, the "availability" of the phosphate (expressed as $P_2O_5$ availability) should be at least 85% as determined by the customary neutral ammonium citrate test, or alternatively by the 2% citric acid solubility test, and by high fertilizer availability is meant a $P_2O_5$ availability exceeding 85% as determined by those tests. This high fertilizer availability is attained when the residual fluorine content is reduced to about 0.2% and less. In the tables hereof, the suitability of the phosphate content of the calcine products as a mineral supplement was determined by the customary hydrochloric acid test ".4% HCl," and the availability of the phosphate as a fertilizer was determined by the customary neutral ammonium citrate test "Citrate," or citric acid test "2% Citric," or both.

In carrying out the second stage of heat-treatment, the phosphate rock should be in a finely divided state preferably so that at least 65% passes through a 200 mesh standard Tyler screen and all passes through a 65 mesh screen. While the charge mixture for this stage of heat-treatment may be in a finely divided form, superior results are attained by forming the finely divided mixture into nodules, pellets, or the like having a high degree of porosity. Nodulizing or the like may be carried out as a preliminary or preparatory operation, or may be effected in situ immediately preceding the heat-treatment. For example, suitable nodules, generally round in shape and varying in diameter from $\tfrac{1}{16}$ to one inch, may be made by moistening the finely divided charge mixture with water or other suitable liquid and tumbling at room temperature in a rotating cylinder, barrel, or the like. From 12 to 18% by weight of water or the like, and generally around 15%, will sufficiently moisten the dry finely divided charge mixture for producing satisfactory nodules by tumbling. For the first stage of heat-treatment, such moistening of the finely divided rock may be at least partially effected by the aqueous solution of phosphoric acid mixed therewith. Nodules may also be made by drying an aqueous slurry of the charge mixture, and cutting the dried product into suitably sized cubes or other shapes. When the heat-treatments are carried out in a rotary kiln, nodulizing may conveniently be effected in situ by making a slurry of the finely divided charge mixture with from 30 to 50% by weight of water, and evaporating the water in the low temperature end of the rotating kiln.

The heat-treatments can be carried out in any suitable calcining apparatus, such as a rotary kiln, electric furnace, shaft furnace, sintering machine, multiple hearth shaft furnace etc. In whatever apparatus employed, intimate and continuous association of water vapor with the entire body of the charge is necessary until substantially complete defluorination is effected, either in the first stage of heat-treatment, or in both stages where complete defluorination is not effected in the first stage. In general, in each stage of heat-treatment, the higher the temperature the shorter is the required detention period at that temperature to effect the contemplated action. In most cases a detention period of 10 to 30 minutes in the hot temperature zone of the calcining apparatus gives satisfactory results. In the first stage of heat-treatment, the calcining temperature is below that at which fusion of the charge mixture will take place. In the second stage of heat-treatment, the calcining temperature is preferably as high as practicable without causing fusion of the charge mixture.

In conditioning the rock with phosphoric acid, the reactions between the rock and acid should proceed as near as possible to completion prior to the heat-treatment. Loss of $P_2O_5$ is likely to result when an incompletely reacted mixture is subjected to the heat-treatment. Factors that influence the reaction rate are the strength of the acid, the moisture (water) content of the rock, and the temperature and duration of conditioning. The more concentrated the acid, the more rapidly does the reaction proceed to completion. On the other hand, sufficient moisture should be present to permit efficient mixing. The effective strength of the acid is affected, i. e. diluted, by the moisture content of the rock. In the case of unground concentrates, customarily containing 10 to 15% water, this is important because if the added acid is too dilute, the acid (further diluted by the water in the rock) does not react with the relatively coarse rock in a reasonable time at normal temperatures. Heating and aging of the mixture promote the reaction rate and hence shorten the necessary period of conditioning. Depending upon the foregoing considerations, any appropriate strength or concentration of acid (i. e. $H_3PO_4$ in water) may be used, 25 to 75% acid being generally available for the purposes of the invention.

The following examples illustrate various practices of the invention with five different natural phosphate materials whose analyses were as follows:

mately mixed with the indicated percentage of phosphoric acid. The percentage of acid (calculated as $H_3PO_4$) mixed with the rock is based on the total weight of the charge (i. e. combined weight of rock and acid). The mixture of rock and acid was made into an aqueous slurry, dried, and broken into nodules about ½ inch in size. These nodules were calcined for 10 minutes at a temperature of 2200° F. in an atmosphere of water vapor. In both stages of heat-treatment, the charge was given 10 minutes to come up to the indicated calcining temperature by slowly pushing it (in a combustion boat) into the hot zone of the furnace.

Preparatory to the second stage of heat-treatment, the first calcine was crushed and finely ground, mixed with the indicated amount of CaO (in the form of $CaCO_3$) and a small amount of bentonite as a bonding agent, and the mixture made into an aqueous slurry, dried and cut into $\frac{1}{8}$ inch cube nodules. The amount of CaO added was either (1) that required to theoretically form $C_3P$ with all the $P_2O_5$ present, or (2) that required to theoretically form $C_3P$ with all the $P_2O_5$ present and additionally to theoretically form $C_2S$ with all the $SiO_2$ present. Except as otherwise indicated, the second stage heat-treatment was carried out in an atmosphere of water vapor. However, where the rock was substantially completely defluorinated in the first stage, equally good results would have been obtained by carrying out the second stage in an atmosphere of air. In all charges, the percentage of added $H_3PO_4$, $CaCO_3$ and bentonite are based on the weight of the charge itself. The chemical balancing or adjustment with CaO can equally well be effected with lime itself, calcium hydrate ($Ca(OH)_2$) or other suitable source of calcium oxide (CaO).

| Rock | $P_2O_5$ | Insol. | $Fe_2O_3$ | $Al_2O_3$ | CaO | F | −200 Mesh |
|---|---|---|---|---|---|---|---|
| Florida Conc. A | 32.33 | 7.06 | (3.12) | | 46.52 | 3.80 | 83.5 |
| Florida Conc. B | 31.98 | 4.27 | 2.98 | .56 | 47.36 | 4.20 | 84.2 |
| North African | 33.75 | 1.99 | .24 | .56 | 51.04 | 4.45 | 81 |
| Russian Apatite | 39.00 | 2.12 | .67 | .74 | 52.37 | 3.44 | 88 |
| Florida Conc. C | 35.77 | 2.80 | (1.77) | | 49.73 | 3.96 | 70.5 |

The heat-treatments were carried out in an electric furnace through which either water vapor or air could be continuously passed in intimate contact with the charge being treated. Preparatory to the first stage of heat-treatment, the rock, ground to the fineness indicated (i. e. per cent through 200 mesh screen), was intimately mixed with the first calcine as to provide in the resulting mixture an amount of CaO equivalent to that theoretically required to form tricalcium phosphate and preferably also to form dicalcium silicate with all the $P_2O_5$ and $SiO_2$, respectively, present in the calcine.

Whatever the source of CaO, such an amount is mixed with the first calcine as to provide in the resulting mixture an amount of CaO equivalent to that theoretically required to form tricalcium phosphate and preferably also to form dicalcium silicate with all the $P_2O_5$ and $SiO_2$, respectively, present in the calcine.

*Table I—Florida rock concentrate A*

| Charge Mixture Per Cent | | Min. in Hot Zone | Deg. F. Hot Zone | Chemical Analysis of Calcines | | | | $P_2O_5$ Availables | | | Chemical Adjustment |
|---|---|---|---|---|---|---|---|---|---|---|---|
| Rock | $H_3PO_4$ | | | F | $SiO_2$ | CaO | $P_2O_5$ | 4% HCl | 2% Citric | Citrate | |

EXAMPLE 1

| Rock | $H_3PO_4$ | | Min | Deg F | F | $SiO_2$ | CaO | $P_2O_5$ | 4% HCl | 2% Citric | Citrate | Chemical Adjustment |
|---|---|---|---|---|---|---|---|---|---|---|---|---|
| 90 | 10 | | 10 | 2,200 | 1.08 | 7.70 | 46.51 | 39.82 | | | | |
| 1st Calcine | $CaCO_3$ | Bent. | | | | | | | | | | |
| 98.81 | .69 | .50 | 10 | 2,700 | Melted | | | | | | | }$P_2O_5$ Balanced to form $C_3P$. |
| 98.81 | .69 | .50 | 10 | 2,600 | .002 | Fused | | | | | | |
| 98.81 | .69 | .50 | 10 | 2,500 | .02 | | | 38.60 | | | 14.01 | |
| 78.00 | 21.50 | .50 | 10 | 2,700 | .09 | | | 35.56 | 35.56 | 32.17 | 32.16 | }$P_2O_5$ and $SiO_2$ balanced to form $C_3P$ and $C_2S$. |
| 78.00 | 21.50 | .50 | 10 | 2,600 | .39 | | | 34.63 | | | 19.62 | |
| 78.00 | 21.50 | .50 | 10 | 2,500 | .58 | | | 34.80 | | | 13.12 | |

Table I—Florida rock concentrate A—Continued

EXAMPLE 2

| Charge Mixture Per Cent | | | Min. in Hot Zone | Deg. F. Hot Zone | Chemical Analysis of Calcines | | | | P₂O₅ Availables | | | Chemical Adjustment |
|---|---|---|---|---|---|---|---|---|---|---|---|---|
| Rock | H₃PO₄ | | | | F | SiO₂ | CaO | P₂O₅ | .4% HCl | 2% Citric | Citrate | |
| 88 | 12 | -------- | 10 | 2,200 | .58 | 7.54 | 46.43 | 41.52 | 38.88 | 23.33 | 7.62 | |
| 1st Calcine | CaCO₃ | Bent. | | | | | | | | | | |
| 95.16 | 4.35 | .49 | 10 | 2,700 | Melted | -------- | -------- | -------- | -------- | -------- | -------- | P₂O₅ balanced to form C₃P. |
| 95.16 | 4.35 | .49 | 10 | 2,600 | .002 | Fused | -------- | -------- | -------- | -------- | 13.99 | |
| 95.16 | 4.35 | .49 | 10 | 2,500 | .006 | | | 40.26 | | | 34.35 | |
| 76.12 | 23.44 | .44 | 10 | 2,700 | .06 | | | 35.64 | 35.64 | 34.50 | 27.72 | P₂O₅ and SiO₂ balanced to form C₃P and C₂S. |
| 76.12 | 23.44 | .44 | 10 | 2,600 | .14 | | | 35.20 | | | 19.12 | |
| 76.12 | 23.44 | .44 | 10 | 2,500 | .25 | | | 35.30 | | | | |

EXAMPLE 3

| Rock | H₃PO₄ | | | | | | | | | | | |
|---|---|---|---|---|---|---|---|---|---|---|---|---|
| 84.0 | 16.0 | -------- | 10 | 2,200 | .03 | 7.30 | 44.45 | 43.41 | 39.88 | 22.77 | 7.33 | |
| 1st Calcine | CaCO₃ | Bent. | | | | | | | | | | |
| 88.80 | 10.74 | .46 | 10 | 2,700 | Melted | -------- | -------- | -------- | -------- | -------- | -------- | P₂O₅ balanced to form C₃P. |
| 88.80 | 10.74 | .46 | 10 | 2,600 | .002 | Fused | -------- | -------- | -------- | -------- | 14.62 | |
| 88.80 | 10.74 | .46 | 10 | 2,500 | .006 | | | 40.76 | | | 36.34 | |
| 73.32 | 26.24 | .44 | 10 | 2,700 | .002 | | | 36.70 | | | 36.06 | P₂O₅ and SiO₂ balanced to form C₃P and C₂S. |
| 73.32 | 26.24 | .44 | 10 | 2,600 | .002 | | | 36.56 | | | 21.77 | |
| 73.32 | 26.24 | .44 | 10 | 2,500 | .01 | | | 36.46 | | | | |

The calcines below made in an atmosphere of air rather than water vapor

| 73.32 | 26.24 | .44 | 10 | 2,700 | .01 | -------- | -------- | 36.64 | 36.60 | 36.00 | 36.34 | P₂O₅ and SiO₂ balanced to form C₃P and C₂S. |
| 73.32 | 26.24 | .44 | 10 | 2,500 | .01 | -------- | -------- | 36.50 | | | 32.70 | |

Table II—Florida Rock Concentrate B

EXAMPLE 4

| Charge Mixture Per Cent | | | Min. in Hot Zone | Deg. F. Hot Zone | Chemical Analysis of Calcines | | | | P₂O₅ Availables | | | Chemical Adjustment |
|---|---|---|---|---|---|---|---|---|---|---|---|---|
| Rock | H₃PO₄ | | | | F | SiO₂ | CaO | P₂O₅ | .4% HCl | 2% Citric | Citrate | |
| 90.00 | 10.0 | -------- | 10 | 2,200 | 1.28 | 5.83 | 47.83 | 40.23 | -------- | -------- | -------- | |
| 1st Calcine | CaCO₃ | Bent. | | | | | | | | | | |
| 99.67 | -------- | .33 | 10 | 2,700 | Melted | -------- | -------- | -------- | -------- | -------- | -------- | P₂O₅ Balanced to form C₃P. |
| 83.21 | 16.34 | .47 | 10 | 2,700 | .29 | | | 36.74 | 36.74 | 29.61 | 29.00 | P₂O₅ and SiO₂ balanced to form C₃P and C₂S. |
| 83.21 | 16.34 | .47 | 10 | 2,600 | .51 | | | 36.23 | | | 13.13 | |
| 83.21 | 16.34 | .47 | 10 | 2,500 | .70 | | | 36.42 | | | 10.17 | |

EXAMPLE 5

| Rock | H₃PO₄ | | | | | | | | | | | |
|---|---|---|---|---|---|---|---|---|---|---|---|---|
| 86.0 | 14.0 | -------- | 10 | 2,200 | .45 | 5.72 | 46.51 | 42.02 | 38.46 | 25.77 | 6.55 | |
| 1st Calcine | CaCO₃ | Bent. | | | | | | | | | | |
| 94.34 | 5.17 | .49 | 10 | 2,700 | Melted | -------- | -------- | -------- | -------- | -------- | -------- | P₂O₅ balanced to form C₃P. |
| 94.34 | 5.17 | .49 | 10 | 2,600 | .002 | Fused | -------- | -------- | -------- | -------- | 11.72 | |
| 94.34 | 5.17 | .49 | 10 | 2,500 | .01 | | | 38.89 | | | 36.40 | |
| 79.28 | 20.29 | .43 | 10 | 2,700 | .02 | | | 37.14 | 36.94 | 36.40 | 27.78 | P₂O₅ and SiO₂ balanced to form C₃P and C₂S. |
| 79.28 | 20.29 | .43 | 10 | 2,600 | .11 | | | 36.78 | | | 17.04 | |
| 79.28 | 20.29 | .43 | 10 | 2,500 | .21 | | | 37.04 | | | | |

Table II—Florida rock concentrate B—Continued

EXAMPLE 6

| Charge Mixture Per Cent | | | Min. in Hot Zone | Deg. F. Hot Zone | Chemical Analysis of Calcines | | | | $P_2O_5$ Availables | | | Chemical Adjustment |
|---|---|---|---|---|---|---|---|---|---|---|---|---|
| Rock | $H_3PO_4$ | | | | F | $SiO_2$ | CaO | $P_2O_5$ | .4% HCl | 2% Citric | Citrate | |
| 84.0 | 16.0 | -------- | 10 | 2,200 | .07 | 5.22 | 45.44 | 43.80 | 41.80 | 22.84 | 6.90 | |
| 1st Calcine | $CaCO_3$ | Bent. | | | | | | | | | | |
| 89.55 | 9.97 | .48 | 10 | 2,700 | Melted | -------- | -------- | -------- | -------- | -------- | -------- | |
| 89.55 | 9.97 | .48 | 10 | 2,600 | .006 | Fused | -------- | -------- | -------- | -------- | -------- | $P_2O_5$ balanced to form $C_3P$. |
| 89.55 | 9.97 | .48 | 10 | 2,500 | .006 | | | 41.02 | | | 15.36 | |
| 76.77 | 22.79 | .44 | 10 | 2,700 | .01 | | | 37.76 | | | 36.32 | |
| 76.77 | 22.79 | .44 | 10 | 2,600 | .01 | | | 37.36 | | | 34.02 | $P_2O_5$ and $SiO_2$ balanced to form $C_3P$ and $C_2S$. |
| 76.77 | 22.79 | .44 | 10 | 2,500 | .04 | | | 37.44 | | | 22.66 | |

Table III—North African Rock

EXAMPLE 7

| Charge Mixture Per Cent | | | Min. in Hot Zone | Deg. F. Hot Zone | Chemical Analysis of Calcines | | | | $P_2O_5$ Availables | | | Chemical Adjustment |
|---|---|---|---|---|---|---|---|---|---|---|---|---|
| Rock | $H_3PO_4$ | | | | F | $SiO_2$ | CaO | $P_2O_5$ | .4% HCl | 2% Citric | Citrate | |
| 90.0 | 10.0 | -------- | 10 | 2,200 | 1.76 | 1.72 | 52.08 | 42.38 | -------- | -------- | -------- | |
| 1st Calcine | $CaCO_3$ | Bent. | | | | | | | | | | |
| 99.50 | -------- | .50 | 10 | 2,700 | .10 | Fuzed | -------- | 42.62 | -------- | -------- | 41.62 | |
| 99.50 | -------- | .50 | 10 | 2,600 | .13 | | | 42.62 | | | 40.92 | $P_2O_5$ balanced to form $C_3P$. |
| 99.50 | -------- | .50 | 10 | 2,500 | .54 | | | 41.96 | | | 26.99 | |
| 96.58 | 2.92 | .50 | 10 | 2,700 | .16 | | | 42.03 | 41.86 | 39.20 | 39.89 | |
| 96.58 | 2.92 | .50 | 10 | 2,600 | .51 | | | 41.92 | | | 33.92 | $P_2O_5$ and $SiO_2$ balanced to form $C_3P$ and $C_2S$. |
| 96.58 | 2.92 | .50 | 10 | 2,500 | .78 | | | 41.90 | | | 24.40 | |

EXAMPLE 8

| Rock | $H_3PO_4$ | | | | | | | | | | | |
|---|---|---|---|---|---|---|---|---|---|---|---|---|
| 83.3 | 16.7 | | 10 | 2,200 | .54 | 2.02 | 49.51 | 45.44 | 39.96 | 25.05 | 9.97 | |
| 1st Calcine | $CaCO_3$ | Bent. | | | | | | | | | | |
| 92.72 | 6.81 | .47 | 10 | 2,700 | .01 | glazed | -------- | 44.26 | 43.84 | 43.76 | 43.46 | |
| 92.72 | 6.81 | .47 | 10 | 2,600 | .01 | | | 43.60 | | | 42.60 | $P_2O_5$ balanced to form $C_3P$. |
| 92.72 | 6.81 | .47 | 10 | 2,500 | .02 | | | 43.85 | | | 31.56 | |
| 86.40 | 13.12 | .48 | 10 | 2,700 | .04 | | | 42.40 | 42.38 | 40.86 | 40.70 | |
| 86.40 | 13.12 | .48 | 10 | 2,600 | .21 | | | 42.40 | | | 36.50 | $P_2O_5$ and $SiO_2$ balanced to form $C_3P$ and $C_2S$. |
| 86.40 | 13.12 | .48 | 10 | 2,500 | .31 | | | 42.40 | | | 28.11 | |

EXAMPLE 9

| Rock | $H_3PO_4$ | | | | | | | | | | | |
|---|---|---|---|---|---|---|---|---|---|---|---|---|
| 79.0 | 21.0 | | 10 | 2,200 | .01 | 1.77 | 47.68 | 47.40 | 38.80 | 26.67 | 4.51 | |
| 1st Calcine | $CaCO_3$ | Bent. | | | | | | | | | | |
| 86.77 | 12.78 | .45 | 10 | 2,700 | .002 | Glassy | -------- | 44.25 | -------- | -------- | 41.83 | |
| 86.77 | 12.78 | .45 | 10 | 2,600 | .006 | | | 44.21 | | | 37.58 | $P_2O_5$ balanced to form $C_3P$. |
| 86.77 | 12.78 | .45 | 10 | 2,500 | .002 | | | 44.61 | | | 26.20 | |
| 81.74 | 17.79 | .47 | 10 | 2,700 | .002 | | | 44.01 | | | 43.91 | |
| 81.74 | 17.79 | .47 | 10 | 2,600 | .002 | | | 43.01 | | | 42.51 | $P_2O_5$ and $SiO_2$ balanced to form $C_3P$ and $C_2S$. |
| 81.74 | 17.79 | .47 | 10 | 2,500 | .002 | | | 42.71 | | | 40.97 | |

Table IV—Russian Apatite

EXAMPLE 10

| Charge Mixture Per Cent | | Min. in Hot Zone | Deg. F. Hot Zone | Chemical Analysis of Calcines | | | | P₂O₅ Availables | | | Chemical Adjustment |
|---|---|---|---|---|---|---|---|---|---|---|---|
| Rock | H₃PO₄ | | | F | SiO₂ | CaO | P₂O₅ | 4% HCl | 2% Citric | Citrate | |
| 90.0 | 10.0 | | 10 | 2,200 | .92 | 1.78 | 50.02 | 43.67 | | | |

| 1st Calcine | CaCO₃ | Bent. | | | | | | | | | |
|---|---|---|---|---|---|---|---|---|---|---|---|
| 96.88 | 2.61 | .51 | 10 | 2,700 | .01 | Fused | | 43.20 | | | 22.90 | P₂O₅ balanced to form C₃P. |
| 96.88 | 2.61 | .51 | 10 | 2,600 | .006 | | | 43.10 | | | 23.70 | |
| 96.88 | 2.61 | .51 | 10 | 2,500 | .008 | | | 42.76 | | | 18.48 | |
| 90.69 | 8.81 | .50 | 10 | 2,700 | .04 | | | 41.86 | 41.86 | 41.40 | 41.46 | P₂O₅ and SiO₂ balanced to form C₃P and C₂S. |
| 90.69 | 8.81 | .50 | 10 | 2,600 | .15 | | | 41.42 | | | 37.82 | |
| 90.69 | 8.51 | .50 | 10 | 2,500 | .42 | | | 41.20 | | | 25.91 | |

EXAMPLE 11

| Rock | H₃PO₄ | | | | | | | | | | |
|---|---|---|---|---|---|---|---|---|---|---|---|
| 52.0 | 18.0 | | 10 | 2,200 | .61 | 1.55 | 46.07 | 48.70 | 27.66 | 12.28 | 6.94 | |

| 1st Calcine | CaCO₃ | Bent. | | | | | | | | | |
|---|---|---|---|---|---|---|---|---|---|---|---|
| 82.69 | 16.83 | .48 | 10 | 2,700 | .01 | Glazed | | 43.21 | Glazed | | 40.67 | P₂O₅ balanced to form C₃P. |
| 82.69 | 16.83 | .48 | 10 | 2,600 | .01 | | | 43.01 | | | 37.58 | |
| 82.69 | 16.83 | .48 | 10 | 2,500 | .03 | | | 43.21 | | | 22.15 | |
| 78.60 | 20.94 | .46 | 10 | 2,700 | .01 | | | 42.02 | | | 41.68 | P₂O₅ and SiO₂ balanced to form C₃P and C₂S. |
| 78.60 | 20.94 | .46 | 10 | 2,600 | .12 | | | 41.92 | | | 38.12 | |
| 78.60 | 20.94 | .46 | 10 | 2,500 | .26 | | | 41.92 | | | 30.94 | |

Table V—Florida Rock Concentrate C

EXAMPLE 12

| Charge Mixture Per Cent | | Min. in Hot Zone | Deg. F. Hot Zone | Chemical Analysis of Calcines | | P₂O₅ Availables | | Chemical Adjustment |
|---|---|---|---|---|---|---|---|---|
| Rock | H₃PO₄ | | | F | P₂O₅ | 2% Citric | Citrate | |
| 84 | 16 | 10 | 2,200 | .92 | 47.10 | 26.16 | | |

| 1st Calcine | CaCO₃ | | | | | | | |
|---|---|---|---|---|---|---|---|---|
| 95 | 5 | 2.5 | 2,700 | .02 Fused | 45.34 | 37.21 | | |
| 95 | 5 | 10 | 2,400 | .03 | 45.34 | 31.94 | | |
| 90 | 10 | 10 | 2,700 | .006 Slightly fused | 44.69 | 41.85 | | |
| 90 | 10 | 10 | 2,400 | .004 | 44.69 | 40.60 | | |
| 85 | 15 | 10 | 2,700 | .04 | 42.50 | 42.85 | 42.46 | P₂O₅ and SiO₂ balanced to form C₃P and C₂S. |
| 85 | 15 | 10 | 2,400 | .04 | 42.50 | 38.96 | 24.64 | |
| 80 | 20 | 10 | 2,700 | .006 | 40.90 | 35.50 | | |
| 80 | 20 | 10 | 2,400 | .02 | 40.82 | 32.96 | | |

From the foregoing tables, it will be seen that far from complete defluorination is obtained in the first stage with the minimum amount (10%) of phosphoric acid, and temperatures approaching close to the fusion temperature is required in the second stage to obtain substantially complete defluorination. With such minimum amount of phosphoric acid, both P₂O₅ and SiO₂ should be balanced with CaO in the second stage in order to obtain a satisfactory fertilizer availability at a temperature safely below the fusion temperature. This condition is illustrated in the run with North African Rock (Table III, Example 7). The lime content of this rock was such that the first calcine produced with the charge containing 10% phosphoric acid contained adequate CaO to form C₃P with all the phosphate present. However, when this calcine is subjected to the second stage of heat-treatment, without additional CaO to balance the silica, difficulty is experienced in practice in attaining a sufficiently high calcining temperature to obtain high fertilizer availability in the final calcine. Therefore, even though the silica content of this rock is relatively low, it should be balanced with lime in order to safely permit a higher calcining temperature without fusing the charge. From Table V it will be seen how, in the second stage of heat-treatment, under and over balancing of the P₂O₅ and the SiO₂ with lime impairs attainment of satisfactory fertilizer availability of the P₂O₅. With the rock used in the run of this table, approximately 15% CaO chemically balances the P₂O₅ and SiO₂ contents of the first calcine.

At least about 15% phosphoric acid is necessary to obtain substantially complete defluorination in the first stage of heat-treatment under the time and temperature conditions of the runs of the foregoing examples. The effectiveness of defluorination in the first stage depends (in addition to the amount of phosphoric acid mixed with the rock) upon the temperature of calcination and the time the charge remains in the high temperature zone of the calcining apparatus, being better the higher the temperature and the longer the period of detention. The following Table VI illustrates the effect of defluorination in the first stage of variations in temperature and detention period with four of the rocks hereinbefore identified, mixed with phosphoric acid in amounts required for obtaining substantially complete defluorination and somewhat smaller amounts. These first stage heat-treatments were carried out in substantially the same manner as hereinbefore described in connection with the runs of Tables I–V. All of these first calcines of Table VI, when subsequently ground, adjusted with lime to chemically form $C_3P$ and $C_2S$ with all the phosphate and silica, respectively, therein, and calcined at a temperature of 2600–2700° F., gave final calcines averaging well under 0.2% fluorine with high fertilizer availability of the phosphate.

Table VI

|  | Per Cent Rock | Per Cent $H_3PO_4$ | Per Cent Fluorine | | |
|---|---|---|---|---|---|
|  |  |  | 10 minutes at 2200° F. | 5 Minutes at 2200° F. | 10 Minutes at 2100° F. |
| Florida Rock Conc. A | 84.0 | 16.0 | .006 | .03 | .02 |
|  | 86.0 | 14.0 | .05 | .18 | .20 |
|  | 87.0 | 13.0 | .33 | .37 | .56 |
|  | 88.0 | 12.0 | .61 | 1.20 | .88 |
| Florida Rock Conc. B | 84.0 | 16.0 | .04 | .05 | .16 |
|  | 85.0 | 15.0 | .06 | .15 | .13 |
|  | 86.0 | 14.0 | .58 | .73 | .66 |
| North African Rock | 79.0 | 21.0 | .01 | .02 | .06 |
|  | 80.3 | 19.7 | .16 | .18 | .20 |
|  | 83.3 | 16.7 | .54 | .58 | .56 |
|  | 85.4 | 14.6 | .83 | .93 | 1.03 |
| Russian Apatite | 81.0 | 19.0 | .41 | .48 | .93 |
|  | 83.0 | 17.0 | .74 | .93 | 1.24 |
|  | 85.0 | 15.0 | .67 | .61 | 1.40 |

In all of the foregoing examples the rock was finely ground, although as hereinbefore stated the first stage of heat-treatment may be practiced with coarser rock. For example, an unground Florida flotation concentrate (substantially all minus 20 mesh) analyzing 35.61% $P_2O_5$, 3.8% fluorine and 4.2% insoluble and containing 10 to 13% water was conditioned with 15% phosphoric acid, the grade of the acid being 63.7% $H_3PO_4$. After mixing, the mixture was allowed to stand for about 20 hours, and was then subjected to calcination in a 3 foot by 40 foot rotary kiln, at a feed rate of 200 pounds per hour. The charge when fed to the kiln contained about 13% water which is a fairly dry mix. The calcining temperature was about 2200° F., and the first calcine averaged 0.24% fluorine. This calcine was finely ground, chemically balanced with CaO to chemically form $C_3P$ and $C_2S$ with all the phosphate and silica present, respectively, and calcined in the same kiln at a temperature of 2600–2700° F., producing a final calcine averaging under 0.2% fluorine, and in which the phosphate had high fertilizer availability.

When only partial defluorination is obtained in the first stage of heat-treatment, the calcining temperature of the second stage should be at least 2600° F. With an incompletely defluorinated first calcine, availability of the $P_2O_5$ as a mineral supplement is obtained in the second stage of heat-treatment at a lower temperature than is high fertilizer availability. When substantially complete defluorination is effected in the first stage, high fertilizer availability of the $P_2O_5$ can generally be obtained with a second stage calcining temperature of 2500–2600° F., that is at a somewhat lower temperature than where the first calcine were only partially defluorinated. Therefore, in localities where phosphoric acid is available at low cost, it is usually preferable to obtain substantially complete defluorination in the first stage. With substantially complete defluorination in the first stage, the second stage is advantageously conducted in an atmosphere of air rather than water vapor, since with a substantially completely defluorinated first calcine high fertilizer availability is generally obtained in the second stage at a lower temperature in an atmosphere of air than in an atmosphere of water vapor. For the best results, the $SiO_2$, in addition to the $P_2O_5$, should be balanced with lime in the second stage, and this is especially so when the $SiO_2$ is in excess of 4%, and also where the amount of phosphoric acid is insufficient to effect substantially complete defluorination in the first stage and especially with rock of high free lime content, i. e. with a CaO content substantially in excess of that required chemically to form tricalcium phosphate with all the $P_2O_5$ content of the rock. Where only the $P_2O_5$ is adjusted with lime, fusion is likely to take place even at a temperature of 2600° F., particularly if the $SiO_2$ is above 4%.

It is generally desirable to fine-grind the first calcine as well as the lime added thereto in order to obtain intimate contact of the lime with the calcine. The calcine and lime may be separately ground, or the two materials may be ground together. Superior results are obtained when the finely divided mixture of first calcine and lime is introduced into the hot temperature zone of the second stage of heat-treatment in the form of porous nodules, especially where further defluorination is to be effected in this stage.

Depending upon local economic conditions, and especially the local cost of phosphoric acid, the invention may be practiced to effect (1) substantially complete defluorination in the first stage heat-treatment in an atmosphere of water vapor and conversion of the phosphate to satisfactory citrate-soluble form in the second stage of heat-treatment in an atmosphere of air, or (2) partial defluorination in the first stage in an atmosphere of water vapor and completion of defluorination and conversion of the phosphate to citrate-soluble form in the second stage in an atmosphere of water vapor. To effect substantially complete defluorination in the first stage, about ½ part by weight of $H_3PO_4$ should be mixed with the rock for each part by weight of $P_2O_5$. The substantially defluorinated product of the first stage has high solubility in .4% HCl and is marketable as a mineral supplement for animal feeds, but its citrate solubility is too low for marketing as a fertilizer. The final calcine, whether completely or only partially defluorinated in the first stage of heat-treatment, is marketable both as a mineral supplement and as a fertilizer.

I claim:

1. The method of defluorinating a phosphate rock containing silica and at least 3% fluorine which comprises mixing the rock with from 10 to 25% by weight of phosphoric acid based on the combined weight of rock and acid, calcining the resulting mixture in an atmosphere of water vapor at a temperature between 1800 and 2600° F. and thereby removing at least half of the fluorine originally contained in the rock, grinding and mixing with the resulting calcine an amount of lime theoretically required, with the lime already present, to form tricalcium phosphate with all the phosphorus pentoxide present in the calcine, and with a sufficient excess of lime theoretically required to combine with the silica present in the calcine to form dicalcium silicate, and calcining the mixture of calcine and lime at a temperature exceeding that of the first calcining step and of at least 2400° F. but not too high to cause fusion of the mixture and thereby producing a phosphate product having a $P_2O_5$ content of at least 35% and containing less than 0.2% fluorine and of high fertilizer availability.

2. The method of defluorinating a phosphate rock which comprises subjecting a phosphate rock containing silica and fluorine to a two-stage heat-treatment, in the first stage of which the rock mixed with phosphoric acid in amount of at least 15% based on the combined weight of rock and acid is calcined in the presence of water vapor at a temperature between 2000 and 2400° F., and in the second stage of which the calcined product of the first stage mixed with that amount of lime theoretically required, with the lime already present, to form tricalcium phosphate with all the phosphorus pentoxide present in the product and with a sufficient excess of lime theoretically required to combine with the silica present in the product to form dicalcium silicate is calcined at a temperature exceeding that of the first stage and of at least 2400° F. but not too high to fuse the mixture and thereby producing a phosphate product having a $P_2O_5$ content of at least 35% and containing less than 0.2% fluorine and of high fertilizer availability.

3. The method of defluorinating a phosphate rock containing silica and at least 3% fluorine and having a $P_2O_5$ content of from 30 to 40% which comprises mixing the rock with from 10 to 25% by weight of phosphoric acid based on the combined weight of rock and acid, calcining the resulting mixture in an atmosphere of water vapor at a temperature between about 2000° F. and about 2400° F., mixing the resulting calcine with that amount of lime theoretically required, with the lime already present, to form tricalcium phosphate with all the phosphorus pentoxide present in the calcine, and with a sufficient excess of lime theoretically required to combine with the silica present in the calcine to form dicalcium silicate, and calcining the resulting mixture at a temperature exceeding that of the first calcining step and within the range of about 2500° F. and about 2700° F.

4. The method of defluorinating a phosphate rock containing silica and at least 3% fluorine and having a $P_2O_5$ content of from 30 to 40% which comprises mixing the rock with phosphoric acid in amount of about one-half part by weight for each part by weight of $P_2O_5$ in the rock and calcining the resulting mixture in an atmosphere of water vapor at a temperature of about 2200° F., finely dividing the resulting calcine and mixing with it an amount of finely divided lime equivalent to that theoretically required, with the lime already present, to form tricalcium phosphate with all the phosphorus pentoxide present in the calcine, and with a sufficient excess of lime theoretically required to combine with the silica present in the calcine to form dicalcium silicate, and calcining the resulting mixture at a temperature of at least 2500° F. but not too high to fuse the mixture.

5. The method of defluorinating a phosphate rock containing silica and at least 3% fluorine and having a $P_2O_5$ content of from 30 to 40% which comprises mixing the rock with phosphoric acid in amount of about one-half part by weight for each part by weight of $P_2O_5$ in the rock, calcining the resulting mixture in an atmosphere of water vapor at a temperature of about 2200° F. and thereby producing a first calcine containing less than 0.2% fluorine, finely dividing said first calcine and mixing with it an amount of finely divided lime equivalent to that theoretically required, with the lime already present, to form tricalcium phosphate with all the phosphorus pentoxide present in the calcine, and with a sufficient excess of lime theoretically required to combine with the silica present in the calcine to form dicalcium silicate, and calcining the resulting mixture in an atmosphere of air at a temperature between about 2500° F. and about 2700° F. and thereby producing a final calcine in which the phosphate content has high fertilizer availability.

CLINTON A. HOLLINGSWORTH.

REFERENCES CITED

The following references are of record in the file of this patent:

UNITED STATES PATENTS

| Number | Name | Date |
|---|---|---|
| 1,994,070 | Foss | Mar. 12, 1935 |
| 2,070,697 | Tromel | Feb. 16, 1937 |
| 2,093,176 | Tromel | Sept. 14, 1937 |
| 2,337,498 | Ritter | Dec. 21, 1943 |
| 2,442,969 | Butt | June 8, 1948 |

FOREIGN PATENTS

| Number | Country | Date |
|---|---|---|
| 13,891 | Great Britain | Feb. 15, 1912 |
| 418,788 | Great Britain | Oct. 31, 1934 |

OTHER REFERENCES

Hill et al., Assoc. of Off. Agri. Chemists, vol. 28, No. 1, 1945, pages 105–118.